US006618224B2

(12) United States Patent
Cripps et al.

(10) Patent No.: US 6,618,224 B2
(45) Date of Patent: Sep. 9, 2003

(54) APPARATUS AND METHOD FOR STABILIZING A DATA TAPE CARTRIDGE FOR TRANSPORT

(75) Inventors: Justin Ryan Cripps, Tucson, AZ (US); David Michael Davis, Tucson, AZ (US); Ernest Stewart Gale, Tucson, AZ (US); Robert Allen Hutchins, Tucson, AZ (US); James Mitchell Karp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/844,383

(22) Filed: Apr. 26, 2001

(65) Prior Publication Data

US 2002/0159191 A1 Oct. 31, 2002

(51) Int. Cl.[7] .............................................. G11B 23/087
(52) U.S. Cl. ......................................... 360/132; 242/348
(58) Field of Search .......................... 360/132; 242/345, 242/345.2, 348; 206/387.1, 307, 310–312, 387.13, 472, 474, 493

(56) References Cited

U.S. PATENT DOCUMENTS

| 4,054,206 | A | * | 10/1977 | Kobayashi et al. ...... 206/387.1 |
| 4,078,657 | A | * | 3/1978 | Schurman ................ 206/387.1 |
| 4,394,989 | A | | 7/1983 | Moris |
| 4,428,482 | A | * | 1/1984 | Ogawa ..................... 206/387.1 |
| 4,676,370 | A | * | 6/1987 | Rudick ......................... 206/1.5 |
| 4,719,529 | A | | 1/1988 | Oishi et al. |
| 5,027,949 | A | * | 7/1991 | Terwilliger et al. ......... 206/406 |
| 5,199,663 | A | * | 4/1993 | Klupt ........................... 242/345 |
| 5,209,351 | A | | 5/1993 | Schoettle et al. |
| 5,219,130 | A | * | 6/1993 | Boshek ..................... 242/338.3 |
| 5,398,881 | A | * | 3/1995 | Krantz et al. ................ 242/347 |
| 5,433,540 | A | | 7/1995 | Alday |
| 5,826,720 | A | * | 10/1998 | Morita ..................... 206/387.1 |
| 5,893,527 | A | * | 4/1999 | Mizutani et al. ............ 242/348 |
| 5,899,327 | A | | 5/1999 | Sykes |
| 5,901,916 | A | * | 5/1999 | McAllister et al. ......... 242/348 |
| 5,913,420 | A | | 6/1999 | Morita |
| 5,954,194 | A | | 9/1999 | Simpson |
| 6,154,342 | A | * | 11/2000 | Vanderheyden et al. ..... 360/132 |
| 6,264,126 | B1 | * | 7/2001 | Shima et al. ................ 242/343 |
| 6,452,747 | B1 | * | 9/2002 | Johnson et al. ............. 360/132 |
| 6,499,686 | B2 | * | 12/2002 | Tsuyuki et al. ............. 242/348 |
| 2001/0045482 | A1 | * | 11/2001 | Taki et al. ................... 242/348 |

FOREIGN PATENT DOCUMENTS

| JP | 05-225746 | * | 9/1993 |
| JP | 07-149390 | * | 6/1995 |

* cited by examiner

Primary Examiner—Brian E. Miller
(74) Attorney, Agent, or Firm—Robert M. Sullivan; Bracewell & Patterson, L.L.P.

(57) ABSTRACT

A device for mechanically isolating the media tape reel of a data tape cartridge from its outer protective housing utilizes a compliant, cylindrical object. The object prevents relative movement between the reel and the housing in three degrees of freedom. The object is inserted into an opening in the housing of the tape cartridge for applying force against the reel. The compliant nature of the object allows it to be retained in the opening and engage the hub of the reel. The reel is pushed and held against an inner surface of the housing to prevent axial, radial, and rotational motion of the reel relative to the housing.

14 Claims, 2 Drawing Sheets

APPARATUS AND METHOD FOR STABILIZING A DATA TAPE CARTRIDGE FOR TRANSPORT

BACKGROUND OF THE INVENTION

1. Technical Field

The present invention relates in general to an improved means for protecting a data recording device, and in particular to an improved means for packaging a data recording device, such as a data tape cartridge, during shipping and handling.

2. Description of the Related Art

Data recording devices, such as data tape drives, record information to or read information from a data storage device, such as the magnetic data tape of a tape cartridge. Tape cartridges typically comprise a pair of cartridge body halves that form a permanent housing or case around a single reel of tape. When in use, the reel is freely rotatable about its axis within the cartridge for unspooling the tape out of the cartridge and spooling the tape back into the cartridge relative to the data tape drive. In addition, the reel is provided with a limited range of motion in both the axial and radial directions of the reel to accommodate for make-up and slight misalignments with the drive elements of the data tape drive. Thus, tape reels typically have three degrees of freedom within the cartridges that permanently house them.

Although this configuration is well suited for operational use, such a range of freedom has the disadvantage of exposing the reel and the tape wound on the reel to potential damage during shipping and handling. In particular, as data tapes have become increasingly thinner, they have become more susceptible to damage during shipping and handling. Unprotected tape cartridges are vulnerable to damage due to shock and vibration, which can result in permanent write or read errors on the media. Thus, an improved apparatus and method for packaging a data recording device, such as a data tape cartridge, during shipping and handling is needed.

SUMMARY OF THE INVENTION

One embodiment of a device for mechanically isolating the media tape reel of a data tape cartridge from its outer protective housing during non-operational use comprises a compliant, cylindrical object. The object prevents relative movement between the reel and the housing in three degrees of freedom. The object is inserted into an opening in the housing of the tape cartridge for applying force against the reel. The compliant nature of the object allows it to be retained in the opening and engage the hub of the reel. The reel is pushed and held against an inner surface of the housing to prevent axial, radial, and rotational motion of the reel relative to the housing during shipping and/or handling to reduce the risk of damage to the media tape and reel.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
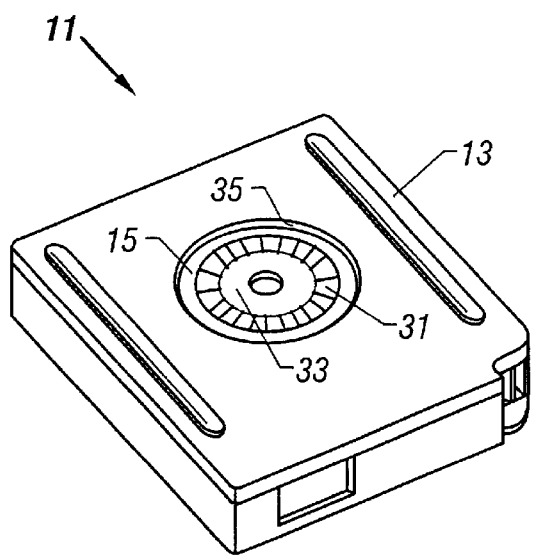
FIG. 1 is an isometric view of a data tape cartridge.
Figure 2:
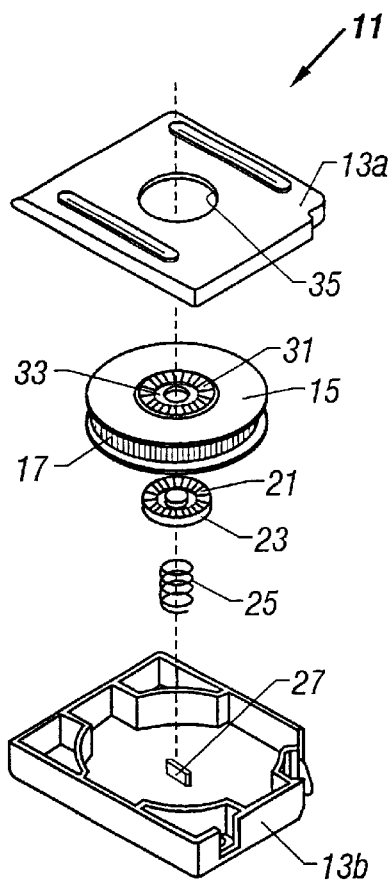
FIG. 2 is an exploded isometric view of the data tape cartridge of FIG. 1.

Referring now to FIGS. 1 and 2, a media storage device such as a magnetic tape cartridge 11 has a permanent outer body or housing 13 with two body halves 13a, 13b. Housing 13 contains a single spool or reel 15 of media tape 17. A toothed portion 21 of a brake button 23 engages reel 15 by an applied force of a brake spring 25. Brake button 23 is locked to a projection 27 of body half 13b to prevent rotation of reel 15 when desired. When brake button 23 is applied to reel 15, media tape 17 can be neither loosened nor pulled out unexpectedly, and accidents caused by tape slack can be prevented from happening.

Tape cartridge 11 is adapted to be loaded into a recording and playback apparatus, such as a tape drive (not shown). The tape drive engages a driving toothed engagement portion 31 of reel 15 for rotating reel 15 relative to housing 13. Brake button 23 is disengaged from reel 15 by the tape drive during this time. Thus, the media tape 17 can be unspooled from reel 15 and out of housing 13 or wound back onto reel 15 by rotating reel 15 in a forward or reverse direction, respectively, via a driving member associated with the tape drive. As best shown in FIG. 1, the hub 33 of reel 15 is accessed through a circular opening 35 in housing 13.

Figure 3:
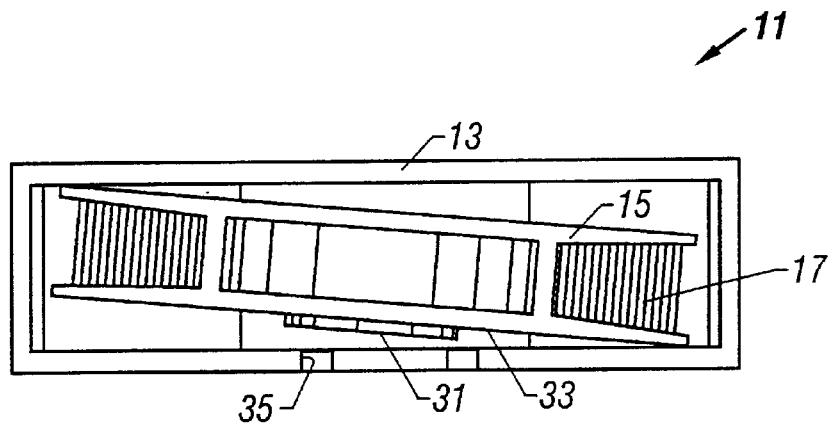
FIG. 3 is a simplified sectional side view of the data tape cartridge of FIG. 1 during a shock or vibration event with the reel shown in an exaggerated position.

Referring now to FIG. 3, a simplified sectional side view of data tape cartridge 11 is shown during a shock or vibration event. In this view, some of the components and features of FIGS. 1 and 2 are not shown, and the range of motion of reel 15 is greatly exaggerated to better illustrate the utility of the present invention. When tape cartridge 11 undergoes a shock or vibration event, such as those occasionally experienced during shipping or handling, reel 15 and tape 17 can be jarred against the inner surfaces of housing 13, which can result in permanent write or read errors on tape 17.

To reduce the risk of such damage to tape cartridge 11, a small, puck-like apparatus 41 is provided for preventing relative movement between reel 15 and housing 13. In the preferred embodiment, apparatus 41 has a low profile and is generally cylindrically shaped. Apparatus 41 may be formed from a variety of compliant materials, including foam. One or more surfaces of apparatus 41 may be provided with optional grooves or teeth 43 that register with and are complementary to the driving toothed engagement portion 31 of reel 15.

Figure 4:
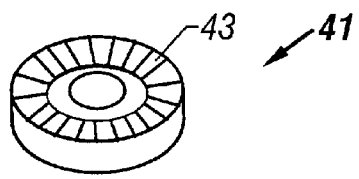
FIG. 4 is an isometric view of a device for isolating the reel of the data tape cartridge of FIG. 1 and is constructed in accordance with the invention.
Figure 5:
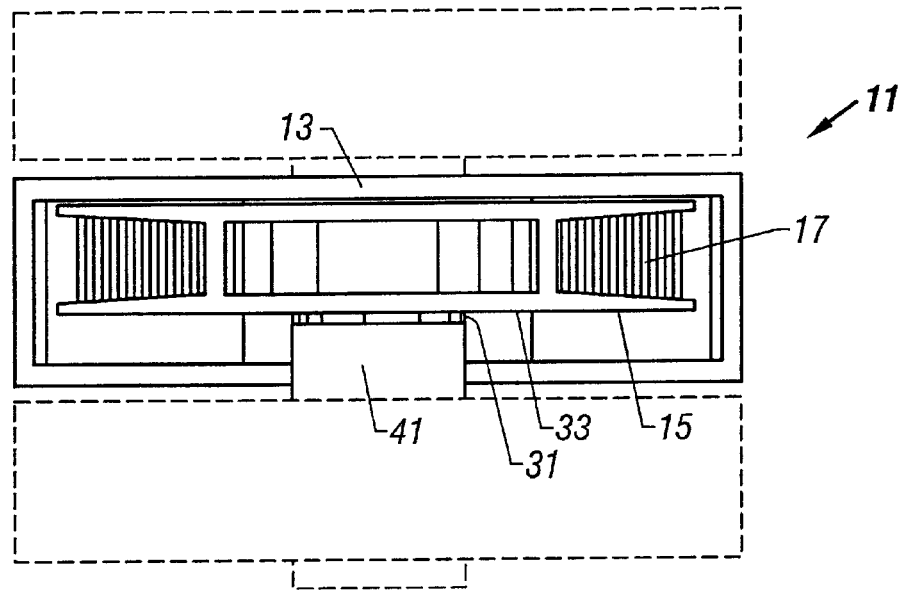
FIG. 5 is the device of FIG. 4 mounted to the data tape cartridge of FIG. 1 in operation.

As shown in FIG. 4, apparatus 41 is inserted into opening 35 in housing 13 of tape cartridge 11 for applying force against and immobilizing reel 15. Opening 35 closely receives apparatus 41 such that apparatus 41 is retained therein. The compliant nature of the material forming apparatus 41 is retained in opening 35 by interference fit or other means. In the version shown, apparatus 41 engages driving toothed engagement portion 31 and pushes reel 15 against an inner surface of housing 13. In this configuration, the axial, radial, and rotational motion of reel 15 relative to housing 13 is prevented. Thus, reel 15 is isolated from motion in three degrees of freedom due to apparatus 41. Apparatus 41 may be configured to isolate reel 15 in more or fewer degrees of freedom as well. In this embodiment, a portion of apparatus 41 protrudes beyond the exterior of housing 13 such that a plurality of tape cartridges 11 may be coaxially stacked, as shown in phantom, for isolation of the individual tape cartridges 11. When individual ones of the data tape cartridges 11 are ready for operational use, the cartridges are unstacked and their respective apparatuses 41 are removed to allow the cartridges to be used in operation.

The present invention has several advantages including the ability to isolate a tape cartridge reel of media tape from excessive movement within the permanent housing it is located. The apparatus of the present invention prevents motion in three degrees of freedom between the reel and the housing, including axial, rotational, and radial motion. Moreover, the same apparatus may be used to isolate multiple ones of the tape cartridges from each other when they are arranged in a stacked, coaxial configuration. The apparatus reduces the risk of damage to the media, particularly the edges of the media, during shipping and/or handling when the tape cartridge is not in use.

While the invention has been shown or described in only some of its forms, it should be apparent to those skilled in the art that it is not so limited, but is susceptible to various changes without departing from the scope of the invention. For example, the present invention also applies to optical tape.

What is claimed is:

1. A data tape cartridge, comprising:
   a housing;
   a reel of media tape located Within the housing and having an axis; and
   an apparatus inserted into direct contact with and in between both the housing and the reel for isolating motion of the reel relative to the housing in at least one degree of freedom, including axial motion, in order to prevent damage to the media tape during handling of the data tape cartridge in non-operational use; wherein the housing has an opening for closely receiving and retaining the apparatus on the housing by interference fit.

2. The data tape cartridge of claim 1 wherein the apparatus is formed from a compliant foam material.

3. The data tape cartridge of claim 1 wherein the apparatus has a solid cylindrical puck-like shape having a substantially consistent diameter and axial thickness.

4. The data tape cartridge of claim 1 wherein the apparatus is provided with grooves on an axial face thereof for engaging complementary grooves on the reel.

5. The data tape cartridge of claim 1 wherein the apparatus protrudes from an exterior of the housing to facilitate compliant isolation of the data tape cartridge in a stack of a plurality of the data tape cartridges.

6. The data tape cartridge of claim 1 wherein the apparatus isolates the reel in two additional degrees of freedom relative to the housing, including rotational and radial motion.

7. A data tape cartridge, comprising:
   a housing having an opening;
   a reel of media tape located within the housing and having an axis; and
   an apparatus formed from a compliant foam material and having a solid, cylindrically-symmetrical, puck-like shape with a symmetrical, substantially consistent diameter and axial dimension, the apparatus being mounted to, closely received by, and retained in the opening of the housing and located between the housing and the reel for isolating the reel in three degrees of freedom relative to the housing in order to prevent damage to the media tape during handling of the data tape cartridge in non-operational use.

8. The data tape cartridge of claim 7 wherein the apparatus is provided with grooves on an axial face thereof for engaging complementary grooves on the reel.

9. The data tape cartridge of claim 7 wherein the apparatus protrudes from an exterior of the housing to facilitate compliant isolation of the data tape cartridge in a stack of a plurality of the data tape cartridges.

10. The data tape cartridge of claim 7 wherein the apparatus isolates the reel in three degrees of freedom relative to the housing, thereby preventing axial, rotational, and radial motion of the reel relative to the housing.

11. A data tape cartridge, comprising;
    a housing having an opening;
    a reel of media tape located within the housing and having an axis and grooves on an axial face thereof;
    an apparatus having a solid, cylindrically-symmetrical, puck-like shape with a substantially consistent diameter and axial dimension, the apparatus being formed from compliant foam material and mounted to, closely received by, and retained in the opening of the housing by interference fit, and located between the housing and the reel in direct physical contact with both the housing and the reel for isolating the reel in three degrees of freedom relative to the housing including axial, rotational, and radial motion for preventing damage to the media tape during handling of the data tape cartridge in non-operational use;
    grooves on an axial face of the apparatus that are complementary in shape to the grooves on the reel; and wherein
    the apparatus protrudes from an exterior of the housing to facilitate compliant isolation of the data tape cartridge in a stack of a plurality of the data tape cartridges.

12. A method of packaging data tape cartridges, comprising:
    (a) providing a plurality of data tape cartridges, each having a housing with an opening, and a reel of media tape located within the housing, each of the reels having an axis;
    (b) mounting an insert into the opening of each of the housings such that the inserts directly contact respective ones of the reels of media tape and the inserts are retained in respective ones of the housings by interference fit; and
    (c) stacking the data tape cartridges such that the inserts are located between the reels and respective adjacent ones of the housings to compliantly isolate the housings, and wherein the inserts isolate motion of the reels relative to the housings in order to prevent damage to the media tape during handling of the data tape cartridges in non-operational use.

13. The method of claim 12 wherein step (b) comprises immobilizing the reels with grooves on axial faces of the inserts that engage complementary grooves on respective ones of the reels.

14. The method of claim 12 wherein step (c) comprises immobilizing the reels in three degrees of freedom relative to the housings including axial, rotational, and radial motion.

* * * * *